United States Patent [19]

Guthrie et al.

[11] 3,904,557

[45] Sept. 9, 1975

[54] METHOD FOR PRODUCTION OF A MULTICOLORED URETHANE SPONGE

[75] Inventors: James Leverette Guthrie, Ashton; Lenore J. Huffman, Ellicott City, both of Md.

[73] Assignee: W. R. Grace & Co., New York, N.Y.

[22] Filed: Feb. 26, 1974

[21] Appl. No.: 446,043

Related U.S. Application Data

[63] Continuation-in-part of Ser. No. 300,939, Oct. 26, 1972, abandoned.

[52] U.S. Cl. .................. 260/2.5 BD; 260/2.5 AK; 260/DIG. 26; 264/73; 264/77
[51] Int. Cl....C08g 22/48; C08g 51/14; C08g 51/66
[58] Field of Search....260/2.5 AK, DIG. 26, 2.5 BD; 264/73, 77; 117/39

[56] References Cited
UNITED STATES PATENTS

| | | | |
|---|---|---|---|
| 2,986,536 | 5/1961 | Anderson | 260/2.5 AK |
| 3,137,671 | 6/1964 | Bosshard | 260/2.5 AK |
| 3,239,474 | 3/1966 | Cwik | 260/2.5 AK |
| 3,278,486 | 10/1966 | Meek | 260/2.5 AK |

OTHER PUBLICATIONS

Given, Modern Encyclopedia of Cooking, Vol. I, J. G. Ferguson & Assoc., Chicago, 1949, pp. 580–581.
Marsh, The Good Housekeeping Cook Book, Rinehart & Co., N.Y. 1949, pp. 663 and 672.
Technical Data Bulletin D–24, "Coloring Polyether Urethane Flexible Foam," Allied Chemical Corp., 1962, pp. 1 to 7.

*Primary Examiner*—Melvyn I. Marquis
*Assistant Examiner*—C. Warren Ivy
*Attorney, Agent, or Firm*—Eugene M. Bond

[57] ABSTRACT

The invention disclosed is for a method of preparing a new multicolored variegated sponge wherein several colors are heterogeneously associated in a given article.

1 Claim, No Drawings

METHOD FOR PRODUCTION OF A MULTICOLORED URETHANE SPONGE

This application is a continuation-in-part of application Ser. No. 300,939, filed Oct. 26, 1972, now abandoned.

This invention relates to a new multicolored variegated sponge. More particularly, the invention relates to a method of producing a multicolored variegated sponge wherein the several colors are heterogeneously associated in the color combinations employed.

Sponges are available to the art wherein a single uniform color is disposed alone or with a printed design thereon. Because of difficulties associated with preparation of sponges from materials such as polyurethanes, multicolored variegated sponges have not been available to the art. It has now been found, however, that by practice of the present invention there is provided new multicolored variegated sponges wherein the several colors are heterogeneously associated in a given article.

It has now been found that a unique multicolored variegated sponge comprising a heterogeneous multicolored foam may be obtained in accordance with the present invention by heterogeneously associating a plurality of differently colored masses prior to foaming. This invention arises out of the surprising discovery that the incorporation of color additions in base formulations prior to foaming enables the production of the heterogeneous color associations by the practice of this invention.

Thus, the present invention provides a multicolored foam product wherein the colors are so combined that a heterogeneous color effect is produced with the separate colors being sharply delineated.

The present invention also provides a method for preparing such multicolored foams wherein the multicolors are combined in distinctive fashion in an initial bun which is severed into multiple units of individual foam products of desired configuration all having a heterogeneous association of colors.

More particularly, the invention provides a method for the preparation of multicolored foam products having at least two distinctively different shades of base formulation which comprises preparing a base formulation, adding distinctively different coloring agents to separate portions of the base formulation, foaming the separate base formulations while combining the colored base formulations into a unitary product having substantially complete color separation. The unitary product may be then sectioned into individual sponges of desired shape and size.

In the present method, a base formulation is prepared from a mixture of ingredients preferably free of coloring pigments and which are blended in a tank. If desired, different base formulations may be prepared for each separate coloring agent to be utilized in the final product or, a single base formulation may be prepared which is divided and subsequently combined with desired colors and pigments. Regardless of how the base formulations are prepared, it is desirable that the base formulations for each color have substantially similar consistencies to produce a uniform product when combined.

After the base formulations have been prepared, individual portions are taken and received in color blending tanks. At least two distinctively different colors are then added to separate portions of the base formulation in the color blending tanks and dispersed by stirrers. In this manner, a plurality of distinctively colored base compositions are prepared for further processing. The base formulations, the coloring agents, and any additive agents may all be combined by any of the mixing methods well known to the art. Also, additional colors and coloring tanks may be used to prepare and combine colored bases as described to give a multicolored product in which more than two distinct colors are combined.

After the colors and pigments have been added to and combined with the base formulation in color blending tanks, and uniformly blended, the formulation is ready for foaming reaction.

The color additives may be introduced either by way of the resin base formulation as previously indicated or otherwise may be introduced by reactant materials used for foaming. It is important that the color additives be soluble or dispersable in either the resin or base formulation, or in materials to be reacted therewith. For example, where an aqueous reactant is employed to effect foaming of the base formulation, the color additive is first blended with the aqueous reactant prior to reaction.

The blended color-containing formulations from the color blending tanks with all reactants for foaming are allowed to flow to a heterogeneous blender. Thus, foaming reaction is initiated prior to combining the color formulations at the heterogeneous blender.

The heterogeneous blender may comprise most any suitable means, including simple hand paddle mixing, which is insufficient to homogenize the colors. Thus, this blender may be most any means which lightly mixes the foaming compositions under laminar-flow conditions. It is recognized that the greater the degree of blending at this location, the greater will be the blending resulting in less contrast of large sections of multi-color effect in the product. Laminar-flow conditions for color blending may be achieved by maintaining a slight reservoir at the constriction of a funnel shaped heterogeneous blender, i.e., the point where the colors are blended. A more desirable method of achieving laminar-flow blending conditions in the heterogeneous association of colored base formulations is to add a divider plate in the funnel for each particular color. Dividing partitions such as annular, sectional and the like may also be employed to impart various design characteristics to the heterogeneous association of colored base formulations. The funnel may be rotated while the exit flow of blended colors is directed into a suitable mold.

Additional procedures may be devised to create desirable swirl and marbelized design effect which may readily be adapted to the present process such as, for example, by employing rotational motion of spigots in place of the funnel, noncircular motion of the funnel, or of the mold, mold oscillating under a stationary funnel, mold oscillating under a rotating funnel, mold rotating under an oscillating funnel, or the like. Other suitable combinations may also be devised which deliver at least two distinctively different colors into heterogeneous association under laminar-flow conditions. The apparatus should therefore be designed to avoid turbulent flow during the combining of the colors.

The term "heterogeneously associated" as used herein means the intimate combination of distinctively different colored base compositions to form a mass having virtually complete color separation which may be easily perceived by the unaided, naked eye.

The compositions for use in base formulations include generally materials useful for polyurethane foam generation. Typically, these foams have been based on reaction of a polyisocyanate using reactants which may include materials such as polyoxyethylene polyol, polyisocyanate, and possibly a catalyst or surfactant which are then foamed.

The polyoxyethylene polyol may have a weight average molecular weight of about 200 to about 20,000, and preferably between about 600 to about 6,000, with a hydroxyl functionality of about 2 or greater, preferably from about 2 to about 8.

Polyoxyethylene polyol is terminated or capped by reaction with a polyisocyanate. The reaction may be carried out in an inert moisture-free atmosphere such as under a nitrogen blanket, at atmospheric pressure at a temperature in the range of from about 0° to about 120°C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisocyanates and polyisothiocyanates which are PAPI-1 (a polyaryl polyisocyanate as defined in U.S. Pat. No. 2,683,730), tolylene diisocyanate, triphenylmethane-4, 4',4''-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisothiocyanate, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylenebis(phenylisocyanate) 4,4'-sulfonylbis(phenylisocyanate) 4,4'-methylene di-orthotolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio. In order to achieve an infinite network formation on foaming, the reactive components may be formulated and reacted subsequent to color addition, using polyurethane reactions for foaming well known to the art.

The coloring agents usefully employed in this invention to provide proper coloring to the base formulation prior to their being heterogeneously associated includes those well known to the art such as, for example, Food, Drug and Cosmetic certified colors and inert pigments. These dyes and pigments may be added in an amount from about 5 to about 20 parts by weight for each 100 parts by weight of base. Typical dyes known to the art may include water soluble and water insoluble dyes.

Coloring agents useful herein having a Colour Index Number falling within 10,000 and 77,999.

Dyes and pigments which are useful include those dyes of the types (Colour Index Numbers falling within 10,000 to 77,999) listed in the table (resproduced below as Table I) which occurs on the first page of the Preamble to Part II (in Volume 3) of the Second (1956) Edition of the Colour Index.

TABLE I

| Classification of Dyes & Pigments | | | |
|---|---|---|---|
| | C.I. Numbers | | C.I. Numbers |
| Nitroso | 10000–10299 | Indamine | 49400–49699 |
| Nitro | 10300–10999 | Indophenol | 49700–49999 |
| Monoazo | 11000–19999 | Azine | 50000–50999 |
| Disazo | 20000–29999 | Oxazine | 51000–51999 |
| Trisazo | 30000–34999 | Thiazine | 52000–52999 |
| Polyazo | 35000–36999 | Sulfur | 53000–54999 |
| Azoic | 37000–39999 | Lactone | 55000–55999 |
| Stilbene | 40000–40999 | Aminoketone | 56000–56999 |
| Diphenylmethane | 41000–41999 | Hydroxyketone | 57000–57999 |
| Triarylmethane | 42000–44999 | Anthraquinone | 58000–72999 |
| Xanthene | 45000–45999 | Indigoid | 73000–73999 |
| Acridine | 46000–46999 | Phthalocyanine | 74000–74999 |
| Quinoline | 47000–47999 | Natural | 75000–75999 |
| Methine | 48000–48999 | Oxidation Bases | 76000–76999 |
| Thiazole | 49000–49399 | Inorganic Pigments | 77000–77999 |

*This table is from the first page of the Preamble To Part II of the Second (1956 Edition of the Colour Index.

pages 495–589 of volume 15 of the Kirk-Othmer Encyclopedia of Chemical Technology, second edition (1968) lists a large number of pigments which can be used in practice of this invention.

Among the useful pigments are:

TABLE II titanium dioxide
basic carbonate white lead
basic sulfate white lead
basic silicate white lead
zinc oxide ("zinc white")
zinc sulfide
lithopone
antimony trioxide
calcium carbonate ("whitings")
gypsum
magnesium silicate
magnesium carbonate
china clays
mica
complex aluminum silicates
silica including diatomaceous earth
barium sulfate
iron oxide pigments including hemitite,
burnt sienna, pyrites, cinder, bauxite-residue red, and synthetic iron oxide
pigments (including synthetic brown iron
oxides)
red lead
orange mineral
cadmium reds
cadmium maroons
cadmium yellows
cuprous oxide
cinnabar
raw umber
metallic browns (mineral browns)
manganese brown
Van Dyke brown
chrome yellows
chrome oranges
molybdenum oranges
zinc yellow
nickel titanate
chrome greens (Brunswick greens)
chromium oxide greens
hydrated chromium oxide
iron blues
ultramine blues
blue basic lead sulfate
carbon blacks
lampblacks
vegetable blacks
animal blacks
graphite
channel black pigments
furnace blacks
aluminum powder
bronze powder
zinc dust

TABLE III pigment yellow 1
pigment yellow 3
pigment yellow 12
pigment yellow 13
pigment yellow 14
pigment yellow 17
pigment orange 1
pigment orange 5
pigment orange 13
pigment orange 16
pigment red 1
pigment red 2
pigment red 3
pigment red 4
pigment red 5
pigment red 6
pigment red 17
pigment red 18
pigment red 22
pigment red 23
pigment red 38
pigment red 48
pigment red 49
pigment red 52
pigment red 53
pigment red 54
pigment red 57
pigment red 60
pigment red 63
pigment red 81
pigment red 83
pigment red 90
acid red 26
pigment violet 1
pigment violet 3
pigment violet 5
pigment blue 1
pigment blue 2
pigment blue 9
pigment blue 14
pigment blue 15
pigment blue 19
pigment blue 24
pigment green 1
pigment green 2
pigment green 4
pigment green 7
pigment green 8
natural black 3

The following materials, recommended for use in urethane foams, are also useful herein.

TABLE IV

| | |
|---|---|
| [1] LANAMID Violet DL | [1] NACCOPERM Red Violet |
| [1] LANAMID Violet RL | [1] NACCOPERM Blue |
| [1] LANAMID Red 3 BS | [1] NACCOPERM Yellow R |
| [1] LANAMID Red GL | [1] NACCOPERM Orange R |
| [1] LANAMID Bordeaux 3BL | [1] NACCOPERM Vermillion |
| [1] LANAMID Yellow GA | [1] NACCOPERM Scarlet |
| [1] LANAMID Yellow 2RL | [1] NACCOPERM Violet |
| [1] LANAMID Brown RD | [1] NACCOPERM Blue R |
| [1] LANAMID Golden Brown | [1] NACCOPERM Blue G |
| [1] LANAMID Brown 2GL | [1] NACCOPERM Green |
| [1] LANAMID Brown TL | [1] NACCOPERM Dark Blue |
| [1] LANAMID Orange RL | [1] NACCOPERM Orange Y |
| [1] LANAMID Grey G | [1] NACCOPERM Magenta |
| [1] LANAMID Grey 2GL | Benzidene[1]Yellow |
| [1] LANAMID Blue BL | Aquablak [2]41 |
| [1] LANAMID Black BGL | Aquablak K |
| | Aquablak No. 1 |
| | Coloidex [2]No. 3 |

[1](Allied Chemical Co.)
[2](Columbian Carbon Co.)

The following pigments recommended for use in urethane foams by Frisch and Saunders, High Polymers, Volume XVI, P. 50 (Interscience, 1964) may also be used.

TABLE V

| | Supplier | Color Index |
|---|---|---|
| Red | | |
| Vulcan Pink G (PR 477) | Verona | 45150 |
| Permanent Carmine FBB Extra | Verona | 12490 |
| Permanent Carmine FR Extra (PR 398) | General Dyestuff | |
| Yellow | | |
| Vulcan Fast Yellow 5G (PR 478) | Verona | |
| Benzidine Yellow OTYT-564-DT (PR 518) | DuPont | 21220 |
| Green | | |
| Heliogen Green GA and GB (PR 483) | General Dyestuff | 74260 |
| Phthalocyanine Green GV (PR 483) | Verona | 74260 |

TABLE V-continued

| | Supplier | Color Index |
|---|---|---|
| Resoform Brilliant Green GP | General Dyestuff | |
| Blue | | |
| Heliogen Blue GV and BNC (PR 481) | General Dyestuff | |
| Phthalocyanine Blue BF (PR 481) | Verona | |
| Resoform Brilliant Blue BP | General Dyestuff | |
| Black | | |
| Philblack A | Philips Petroleum | |
| Pigment Fast Black TW | Verona | |

Further dyes useful herein include Rosaniline hydrochloride, Brilliant Ponceau, and Acridine red. In another, they were Methyl Yellow, Naphthol Green B, and Alpha-azurine 2G.

Although foaming of the present resin reactant is effected simply, it is also possible to add, although not necessary, supplemental foaming materials such as those well known to the artificial sponge foaming art.

The following will aid in explaining, but should not be deemed as limiting, practice of the present invention. In all cases, unless otherwise noted, all parts and percentages are by weight.

EXAMPLE 1

To a reaction vessel containing 3,092 grams, representing 1 mole, 3 eq. OH, of a triol prepared from potassium hydroxide catalyzed reaction of 92 grams anhydrous glycerol with 3300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant level of 0.79 meq. NCO/gram. 0.5 gram of a silicone surfactant, commercially available under the mark L520 by Union Carbide, was added to 200 grams of recovered resin reactant.

0.5 gram of Acridine red dye was dissolved in a first portion of 50 grams of water; 0.5 gram of Naphthol Green B was dissolved in a second portion of 50 grams of water; and 0.5 gram of methyl yellow in a third portion of 50 grams of water. Three 50 gram portions of recovered resin reactant were taken and each separately reacted with each portion of dye containing water. Each mixture was stirred approximately 20 seconds until a uniform creamy stage of foaming was reached. The three batches with different colors were made simultaneously, and these were poured into a cubical mold which was 6 inches on each side. The desired degree of color mixing was done by stirring with a spatula. The foam filled the mold, then gelled within 5 minutes. It was removed from the mold and cut into slices with an electric knife, revealing different tricolored patterns in each slice.

EXAMPLE 2

The procedure of Example 1 was repeated except that the polymer was prepared as follows.

A solution of 92 grams glycerol representing 1 mole, 3 eq. OH, and 134 grams of trimethylolpropane representing 1 mole, 3 eq. OH was outgassed at 100°C. and 10 Torr for 2 hours. To the outgassed solution was added 870 grams representing 5 moles tolylene diisocyanate having an 80/20 mixture of 2,4 isomer/2,6 isomer. The reaction solution was stirred at 60°C. for 4 hours whereupon the actual isocyanate content reacted a constant 2.49 meq. NCO/gram relative to a theoretical content of 2.54. The resin product had a pale orange color, a density of 1.10, and a viscosity (Brookfield No. 4 spindle) at 25°C. of 13,400 cps. The results of this example were similar to those of Example 1 in preparing the multicolored sponge.

EXAMPLE 3

The procedure of Example 2 was repeated except using polyethylene glycol having a weight average molecular weight of 1,540 in place of trimethylolpropane. Corresponding results were realized except the foam appeared to have slightly smaller cell diameters.

EXAMPLE 4

The procedure of Example 3 was repeated except using polyethylene glycol having a weight average molecular weight of 1800. Corresponding results were realized.

EXAMPLE 5

The procedure of Example 1 was repeated using as one dye, 0.5 gram Calcotone Green G, 0.3 gram Calcotone Blue GPN as a second dye and 0.2 gram Oil Yellow 3G as a third dye. Corresponding results were realized.

EXAMPLE 6

The procedure of Example 5 was repeated except that the colored resin was foamed in a mold having the shape of a rabbit. The resultant multicolored sponge proved useful as a bath sponge for children.

EXAMPLE 7

The procedure of Example 5 was repeated using combinations of the following dyes:

| | | Color Index |
|---|---|---|
| Methyl Violet | | 42535 |
| Congo Red | | 22120 |
| Fast Acid Green B | | 20440 |
| Ethyl violet | | 42600 |
| Azosol Fast Yellow G | | 18820 |
| Sudan Green 4B | | 61565 |
| Irgazin Yellow 2 G LT | | |
| Azosol Fast Blue | | 45205 |
| Calco Oil Orange | | |
| Azosol Brilliant Red Y | | |
| Sudan yellow GRN | | 21230 |
| Plasto Red B (Allied) | | Index No. 21120 |
| Plasto Blue RDA (Allied) | | |
| Oil Yellow 3G (Allied) | | |
| Calcotone Red B | (Cyanamide) | Index No. 21120 |
| Calcotone Blue GPN | (Cyanamide) | |
| Calcotone Violet RP | (Cyanamide) | |
| Calcotone Green G | (Cyanamide) | |

| -continued | |
|---|---|
| Color Index | |
| Calco Oil Orange Z07078 | (Cyanamide) |

The simplicity and foolproof nature of preparing the foams without excessive expenditures for equipment characterizes them economically attractive.

It is understood that the foregoing detailed description is given merely by way of illustration and that many variations may be made therein without departing from the spirit of this invention.

What is claimed is:

1. A method for preparing a multicolored variegated polyurethane foam which comprises, preparing a prepolymer by capping polyoxyethylene polyol with polyisocyanate, the polyoxyethylene polyol having a weight average molecular weight of about 200 to about 20,000 and a hydroxyl functionality of about 2 to about 8, adding distinctively different colored compositions easily perceived by the unaided, naked eye to separate portions of the prepolymer or water, said colored compositions being water-soluble or dispersable in water or the prepolymer, mixing the separate colored portions of prepolymer or water with respective portions of water or prepolymer to form separate colored foaming masses, and mixing said foaming masses under laminar flow conditions to form a unitary product having substantially complete color separation, and recovering a multicolored variegated polyurethane foam.

* * * * *